US008350721B2

(12) United States Patent
Carr

(10) Patent No.: US 8,350,721 B2
(45) Date of Patent: Jan. 8, 2013

(54) GEOGRAPHICALLY SPECIFIC EMERGENCY NOTIFICATION

(75) Inventor: Jeffrey Thomas Carr, Highland Village, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 599 days.

(21) Appl. No.: 12/506,789

(22) Filed: Jul. 21, 2009

(65) Prior Publication Data

US 2011/0018736 A1 Jan. 27, 2011

(51) Int. Cl.

| | |
|---|---|
| *G08G 1/00* | (2006.01) |
| *G08G 1/16* | (2006.01) |
| *G01C 21/00* | (2006.01) |
| *G01C 21/26* | (2006.01) |
| *G01C 21/34* | (2006.01) |

(52) U.S. Cl. ......... 340/903; 340/902; 701/414; 701/422

(58) Field of Classification Search .................. 340/902, 340/903; 701/414, 422

See application file for complete search history.

(56) References Cited

U.S. PATENT DOCUMENTS

| | | | | |
|---|---|---|---|---|
| 6,339,382 | B1 * | 1/2002 | Arbinger et al. | 340/903 |
| 6,529,831 | B1 * | 3/2003 | Smith et al. | 701/301 |
| 6,700,504 | B1 * | 3/2004 | Aslandogan et al. | 340/901 |
| 7,515,065 | B1 * | 4/2009 | Bygrave et al. | 340/902 |
| 7,865,309 | B2 * | 1/2011 | Taylor | 701/301 |
| 2003/0014187 | A1 * | 1/2003 | Chun et al. | 701/209 |
| 2003/0043056 | A1 * | 3/2003 | Siegel | 340/902 |
| 2003/0141990 | A1 * | 7/2003 | Coon | 340/902 |
| 2005/0192746 | A1 * | 9/2005 | King et al. | 701/213 |
| 2006/0155462 | A1 * | 7/2006 | Sumizawa et al. | 701/208 |
| 2006/0176191 | A1 * | 8/2006 | Galindo | 340/902 |
| 2008/0133120 | A1 * | 6/2008 | Romanick | 701/123 |
| 2008/0180889 | A1 * | 7/2008 | Ozaki | 361/679 |
| 2009/0157289 | A1 * | 6/2009 | Graessley | 701/123 |
| 2011/0115644 | A1 * | 5/2011 | Grotendorst et al. | 340/903 |

* cited by examiner

*Primary Examiner* — Jennifer Mehmood
*Assistant Examiner* — Andrew Bee

(57) ABSTRACT

A mobile device is associated with navigational information of a client vehicle and provides the navigational information of the client vehicle to an emergency vehicle notification service. The mobile also receives an emergency vehicle message from the emergency vehicle notification service, where the emergency vehicle message includes navigational information of an emergency responder vehicle. The mobile device determines updated navigational information of the client vehicle, and identifies a projected intersection between a path of the emergency responder vehicle and a path of the client vehicle based on the emergency vehicle message and the updated navigational information of the client vehicle. The mobile device generates an alert signal to a user of the mobile device based on the identification of the projected intersection.

21 Claims, 9 Drawing Sheets

GEOGRAPHICALLY SPECIFIC EMERGENCY NOTIFICATION

BACKGROUND INFORMATION

Emergency responder vehicles typically rely on general indicators, such as sirens and/or colored lights, to alert others as the emergency responder vehicle approaches. These indicators may provide insufficient time to allow other vehicles to effectively clear an approach path for the emergency responder vehicle. Furthermore, drivers of other vehicles may not be able to determine the approach direction of an emergency responder vehicle, which may make it difficult to anticipate what appropriate action (if any) is necessary to clear an approach patch for the emergency responder vehicle.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1A:
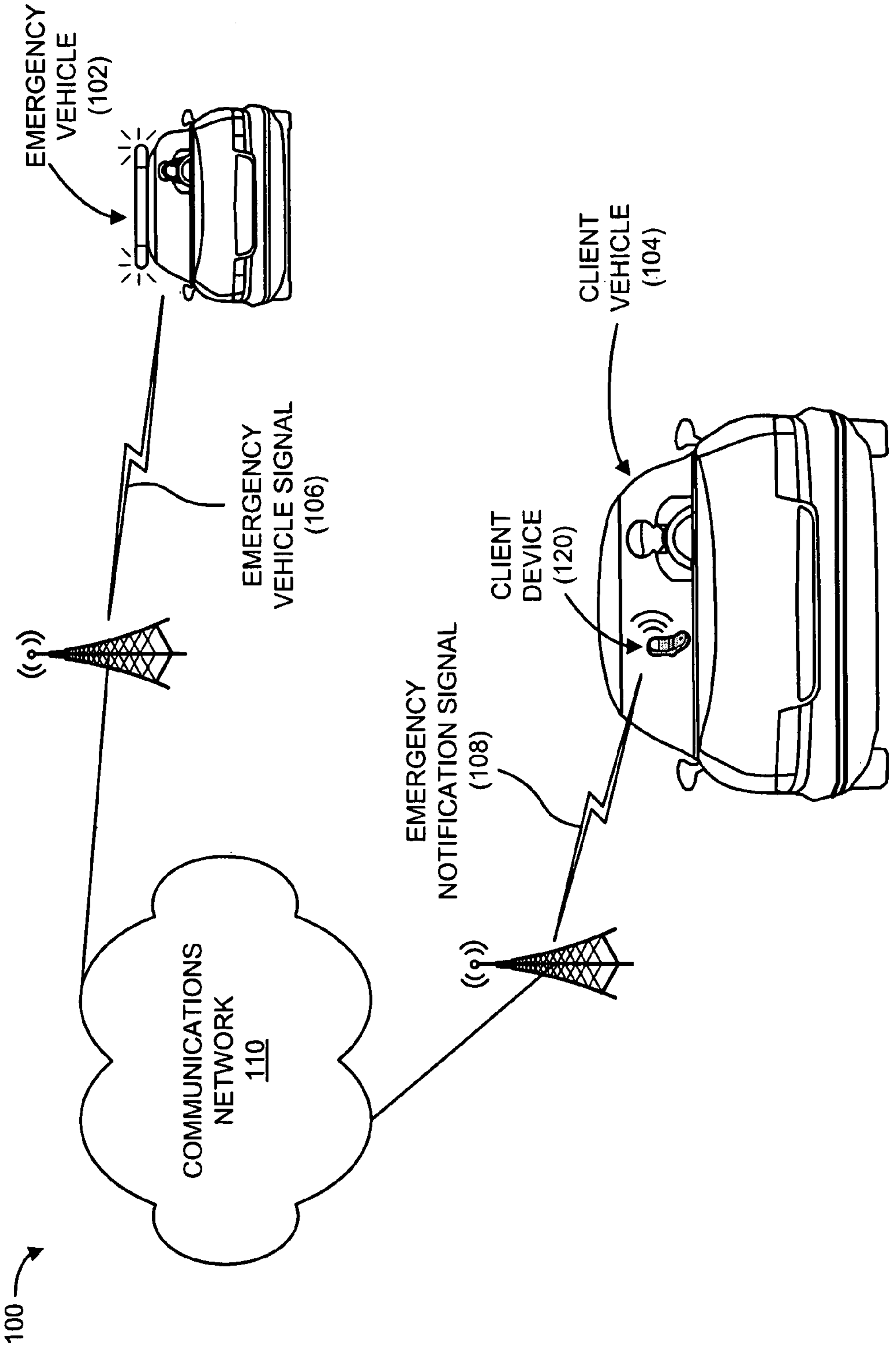
FIGS. 1A and 1B provide diagrams illustrating exemplary implementations of concepts described herein.
Figure 1B:
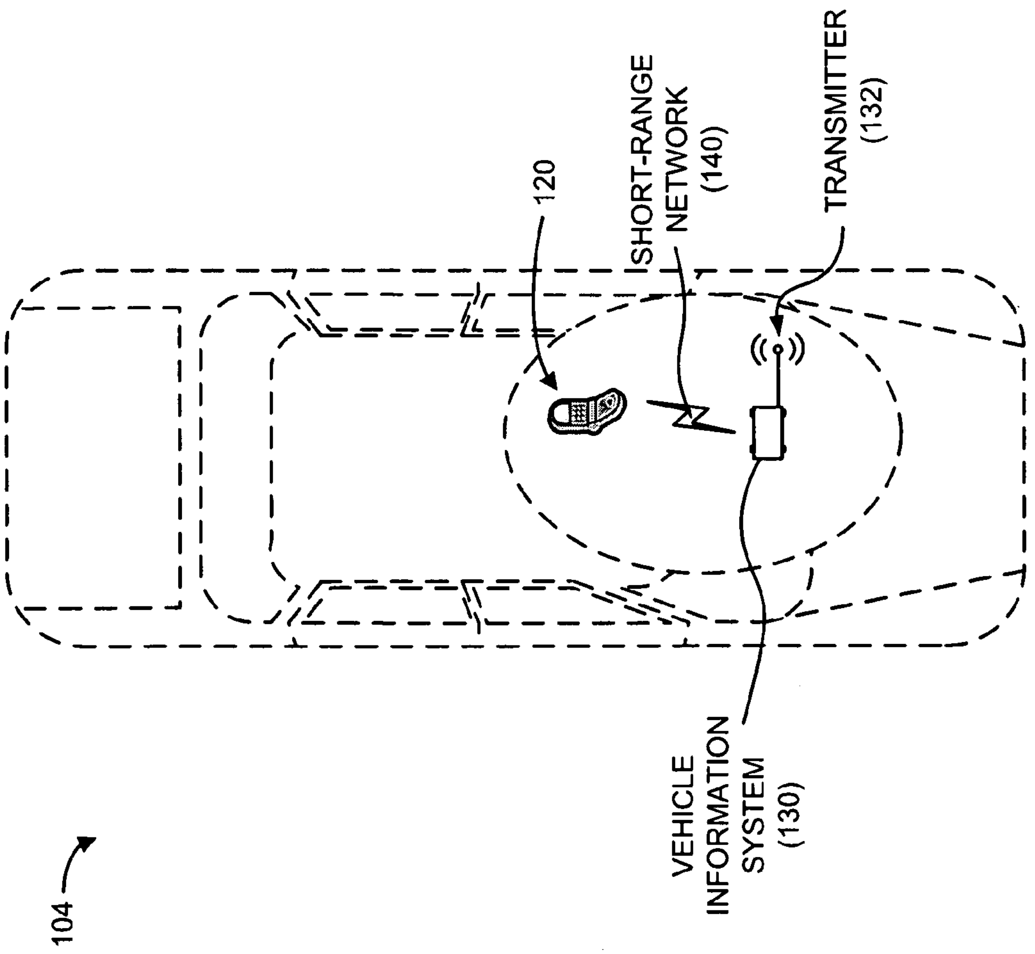

Systems and/or methods described herein may provide a warning to a vehicle operator via a client device (e.g., a mobile phone or other mobile electronic device) of an approaching emergency responder vehicle. FIGS. 1A and 1B provide diagrams illustrating exemplary implementations of concepts described herein. FIG. 1A depicts an environment 100 in which systems and/or methods described herein may be implemented. FIG. 1B depicts an exemplary client vehicle within environment 100.

Referring to FIG. 1A, an emergency responder vehicle 102 (e.g., an ambulance, a police car, a fire truck, etc.) may enter an emergency mode to quickly approach a target/destination. Emergency responder vehicle 102 may enter emergency mode by, for example, turning on a siren and/or emergency lights associated with the vehicle. Under conventional operations, other vehicles (including a client vehicle 104) in the path of emergency responder vehicle 102 may be alerted by the siren and/or lights and move aside to allow emergency responder vehicle 102 to pass. However, in some situations, sirens and/or lights may provide insufficient warning to other vehicles. Thus, according to implementations described herein, emergency responder vehicle 102 may send an emergency vehicle signal 106 (e.g., a radio frequency (RF) signal) that indicates a position, direction, and/or destination of emergency responder vehicle 102. Emergency vehicle signal 106 may be transmitted over a communications network 110 and converted/forwarded as emergency notification signal 108.

Emergency notification signal 108 may be sent to a client device 120 (e.g., a mobile phone) associated with client vehicle 104. In some implementations, emergency notification signal 108 may be sent to any client device 120 that subscribes to an emergency vehicle warning service. In other implementations, emergency notification signal 108 may be provided to any client device identified within a particular distance or region of emergency vehicle signal 106. Client device 120 may receive emergency notification signal 108 and process emergency notification signal 108 to determine its relevancy for client vehicle 104. For example, client device 120 may compare the position, direction, and/or destination of emergency responder vehicle 102 (as indicated by emergency vehicle signal 106 and emergency notification signal 108) with the current position, direction, and/or destination of client vehicle 104.

If client device 120 determines there is a potential intersection of emergency responder vehicle 102 and client vehicle 104, client device 120 may provide a warning indication to a user of client device 120. The warning indication may be in the form of an audible tone, a message over a speakerphone, a text message, and/or other indications. In one implementation, client device 120 may process emergency notification signal 108 only when client device 120 is in a driving mode. The driving mode may provide an indication to client device 120 that emergency notification signal 108 should be processed by client device 120. The driving mode for client device 120 may be activated manually (e.g., via a user pressing a control button on client device 120) or automatically (e.g., by client device 120 pairing with a vehicle information system or via integrating client device 120 with other features of vehicle 104, such as a key fob). Use of the driving mode to selectively process emergency notification signal 108 may prevent client device 120 from sending unnecessary alerts to a user (e.g., when the user is not in a vehicle or the user is a non-operator (passenger) in a moving vehicle such as a bus, train or taxi).

In one implementation, client device 120 may determine a current position, direction, and/or destination of client vehicle 104 using Global Positioning System (GPS) technology integrated with client device 120. In another implementation, client device 120 may determine the current position, direction, and/or destination of client vehicle 104 via communicating with a vehicle information system of client vehicle 104. FIG. 1B depicts an exemplary client vehicle 104 with client device 120 communicating with a vehicle information system 130 via a short-range network 140.

Client device 120 may include a device capable of transmitting and/or receiving data (e.g., voice, text, images, and/or multimedia data) over a wireless network, such as communication network 110. For example, client device 120 may include a handheld device, such as a cellular telephone, a personal digital assistant (PDA), etc.; a conventional laptop and/or palmtop computer; and/or another appliance that includes a radiotelephone transceiver with Mobile Internet Protocol (Mobile IP) capabilities. Client device 120 may also include a device capable of transmitting and/or receiving data over short-range network 140. For example, client device 120 may include any type of device that is capable of transmitting and/or receiving data to/from vehicle computer 120. In one implementation, client device 120 may communicate via packet-based or non-packet-based wireless transmissions.

Vehicle information system 130 may include one or more computation or communication devices, that gather, process, search, and/or provide information in a manner described herein. In one implementation, vehicle information system 130 may include an original equipment manufacturer (OEM) component associated with client vehicle 104. In other implementations, vehicle information system 130 may include an after-market navigation system associated with client vehicle 104. Vehicle information system 130 may communicate with a satellite GPS system to collect information about the position, direction, destination, and/or condition of client vehicle 104. In an exemplary implementation, vehicle information system 130 may establish a data connection with client device 120, and may transmit to client device 120 (e.g., via a transmitter 132) real-time (or near-real time) vehicle information. In one implementation, vehicle information system 130 may transmit particular vehicle information to determine the relevance of emergency notification signal 108 to client vehicle 104.

Transmitter 132 may convert baseband signals from vehicle computer 120 into RF signals and may transmit the RF signals over the air (e.g., to client device 120). In one implementation, transmitter 132 may include a low-power signal that can be adjusted to the match the size of a particular vehicle. For example, depending on the location of transmitter 132 within client vehicle 104, the effective range of transmitter 132 may be adjusted between about 3 feet and 30 feet, and, in another implementation, between 5 and 10 feet.

Short-range network 140 may employ one or more wireless communication protocols for a wireless personal area network (WPAN) and/or a wireless local area network (WLAN), such as, for example, IEEE 802.15 (e.g., Bluetooth) and IEEE 802.11 (e.g., Wi-Fi). In other implementations, different short-range wireless protocols and/or frequencies may be used for short-range network 140.

In implementations described herein, client device 120 may automatically initiate a connection with, for example, vehicle information system 130 over short-range network 140 when client device 120 is within the area of short-range network 140. Vehicle computer 120 may transmit vehicle information to client device 120 allowing client device 120 to compare information from emergency notification signal 108 with current information for client vehicle 104.

Although FIGS. 1A and 1B show exemplary components of environment 100, in other implementations, environment 100 may contain fewer, different, differently arranged, or additional, components than depicted in FIGS. 1A and 1B. In still other implementations, one or more components of environment 100 may perform one or more other tasks described as being performed by one or more other components of environment 100.

Figure 2:
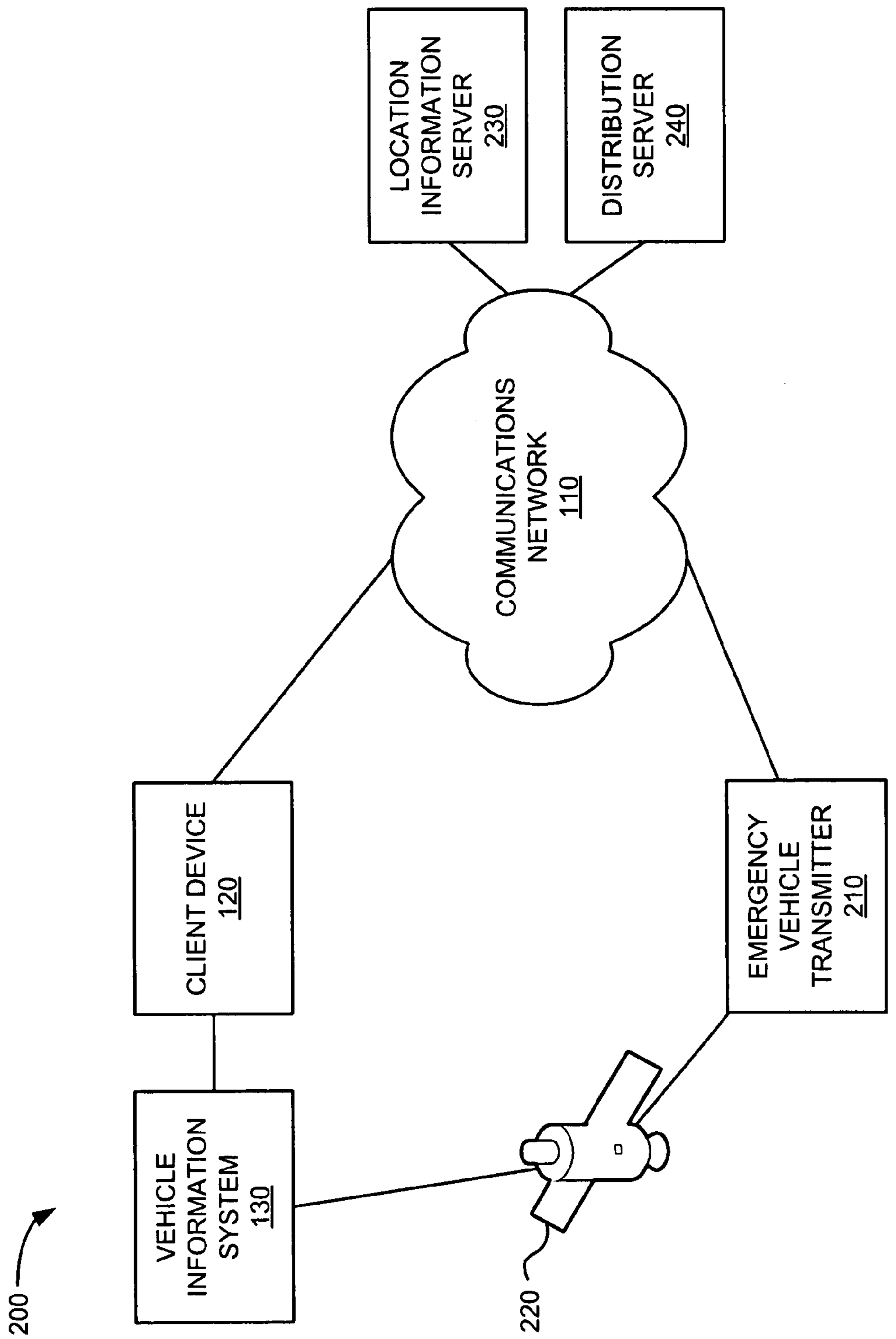
FIG. 2 depicts an exemplary network in which systems and/or methods described herein may be implemented.

FIG. 2 depicts an exemplary network 200 in which systems and/or methods described herein may be implemented. Network 200 may include a communications network 110, client device 120, vehicle navigation system 130, an emergency vehicle transmitter 210, a locator system 220, a location information server 230, and a distribution server 240. Communications network 110, client device 120, and vehicle navigation system 130 may include features described above in connection with, for example, FIGS. 1A and/or 1B.

Emergency vehicle transmitter 210 may include one or more computation or communication devices, that gather, process, search, and/or provide information in a manner described herein. In one implementation, emergency vehicle transmitter 210 may include a navigation system associated with emergency responder vehicle 102. Emergency vehicle transmitter 210 may communicate with locator system 220 to collect information about the position, direction, destination, and/or condition of emergency responder vehicle 102. In an exemplary implementation, emergency vehicle transmitter 210 may transmit emergency vehicle signal 106, via communications network 110, with real-time (or near-real time) vehicle information. In one implementation, emergency vehicle transmitter 210 may transmit emergency vehicle signal 106 whenever an operator of emergency responder vehicle 102 activates the sirens and/or emergency lights of emergency responder vehicle 102. In other implementations, emergency vehicle transmitter 210 may continue to transmit emergency vehicle signal 106 at regular intervals whenever the sirens and/or emergency lights of emergency responder vehicle 102 remain in operation.

Locator system 220 may include a satellite GPS system, a cellular tower triangulation system, or another system that determines real-time (or near real-time) location information for subscribing devices, such as emergency vehicle transmitter 210, vehicle navigation system 130, and/or client device 120.

Location information server 230 may include one or more server entities, or other types of computation or communication devices, that gather, process, search, and/or provide information in a manner described herein. In one implementation, location information server 230 may collect and provide, to distribution server 240, real-time (or near real-time) location information for emergency responder vehicle 102 and/or client vehicle 104. In some implementations, the location information may be, for example, global positioning system (GPS) information or another form of global navigation satellite system (GNSS) information collected from a device (e.g., emergency vehicle transmitter 210, vehicle navigation system 130, and/or client device 120) associated with emergency responder vehicle 102 and/or client vehicle 104. In other implementations, the location information may be in the form of cellular tower triangulation information collected from a mobile communications device (e.g., client device 120).

Distribution server 240 may include one or more computation or communication devices that may receive emergency vehicle signal 106 and determine where to route emergency vehicle signal 106 in network 200 (e.g., from emergency vehicle transmitter 210 through communications network 110 to client device 120). Distribution server 240 may transmit routing information (for example, in the form of appropriate command messages) that identifies the desired client device 120 to appropriate interfaces within communications network 110.

Although FIG. 2 shows exemplary components of network 200, in other implementations, network 200 may contain fewer, different, differently arranged, or additional components than depicted in FIG. 2. In still other implementations, a component of network 200 may perform one or more tasks described as being performed by another component of user network 200.

Figure 3:
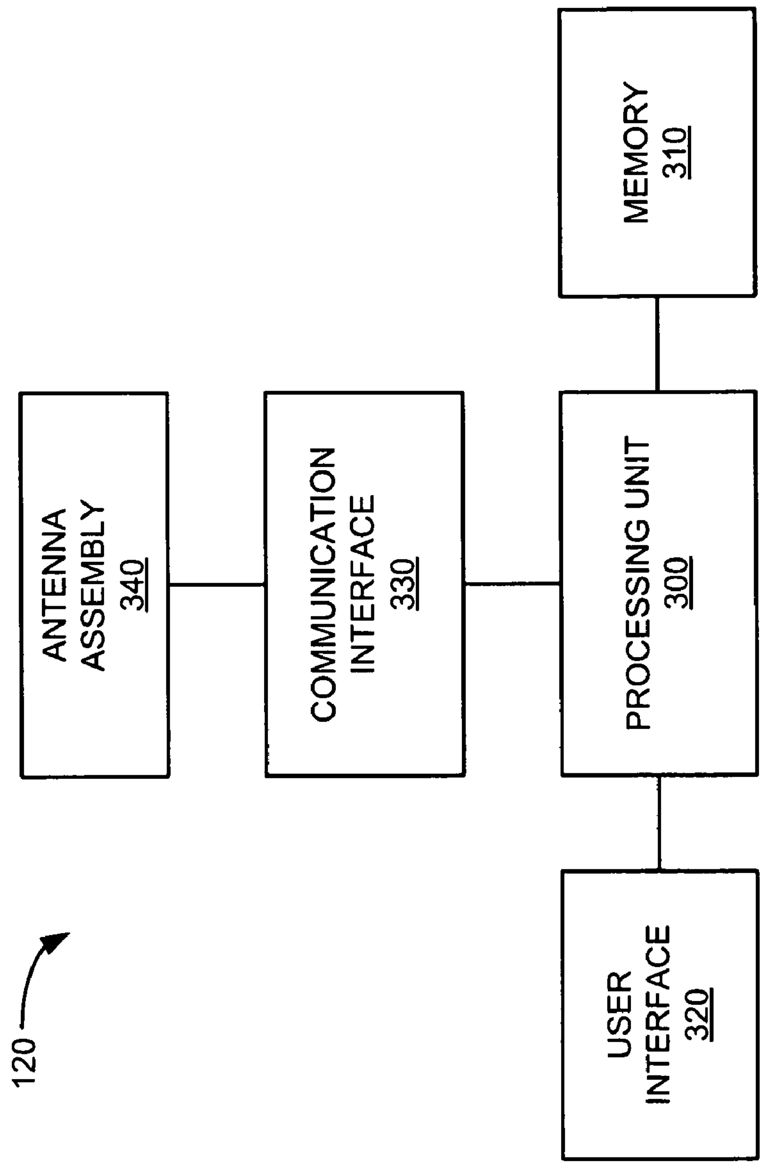
FIG. 3 depicts a diagram of exemplary components of a client device of FIG. 2.

FIG. 3 is a diagram of exemplary components of client device 120. As illustrated, client device 120 may include a processing unit 300, memory 310, a user interface 320, a communication interface 330, and/or an antenna assembly 340.

Processing unit 300 may include one or more processors, microprocessors, application specific integrated circuits (ASICs), field programmable gate arrays (FPGAs), or the like. Processing unit 300 may control operation of client device 120 and its components. In one implementation, processing unit 300 may control operation of components of client device 120 in a manner described herein.

Memory 310 may include a random access memory (RAM), a read-only memory (ROM), and/or another type of memory to store data and instructions that may be used by processing unit 300. In one implementation, memory 310 may store instructions for processing emergency notification signal 108.

User interface 320 may include mechanisms for inputting information to client device 120 and/or for outputting information from client device 120. Examples of input and output mechanisms might include buttons (e.g., control buttons, keys of a keypad, a joystick, etc.) or a touch screen interface to permit data and control commands to be input into client device 120; a speaker to receive electrical signals and output audio signals; a microphone to receive audio signals and output electrical signals; and/or a display to output visual information (e.g., text input into client device 120).

Communication interface 330 may include, for example, a transmitter that may convert baseband signals from processing unit 300 to RF signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network (e.g., vehicle information system 130 via short-range network 140).

As will be described in detail below, client device 120 may perform certain operations in response to processing unit 300 executing software instructions of an application contained in a computer-readable medium, such as memory 310. A computer-readable medium may be defined as a physical or logical memory device. A logical memory device may include memory space within a single physical memory device or spread across multiple physical memory devices. The software instructions may be read into memory 310 from another computer-readable medium or from another device via communication interface 330. The software instructions contained in memory 310 may cause processing unit 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of client device 120, in other implementations, client device 120 may contain fewer, different, differently arranged, or additional components than depicted in FIG. 3. In still other implementations, one or more components of client device 120 may perform one or more other tasks described as being performed by one or more other components of client device 120.

Figure 4:
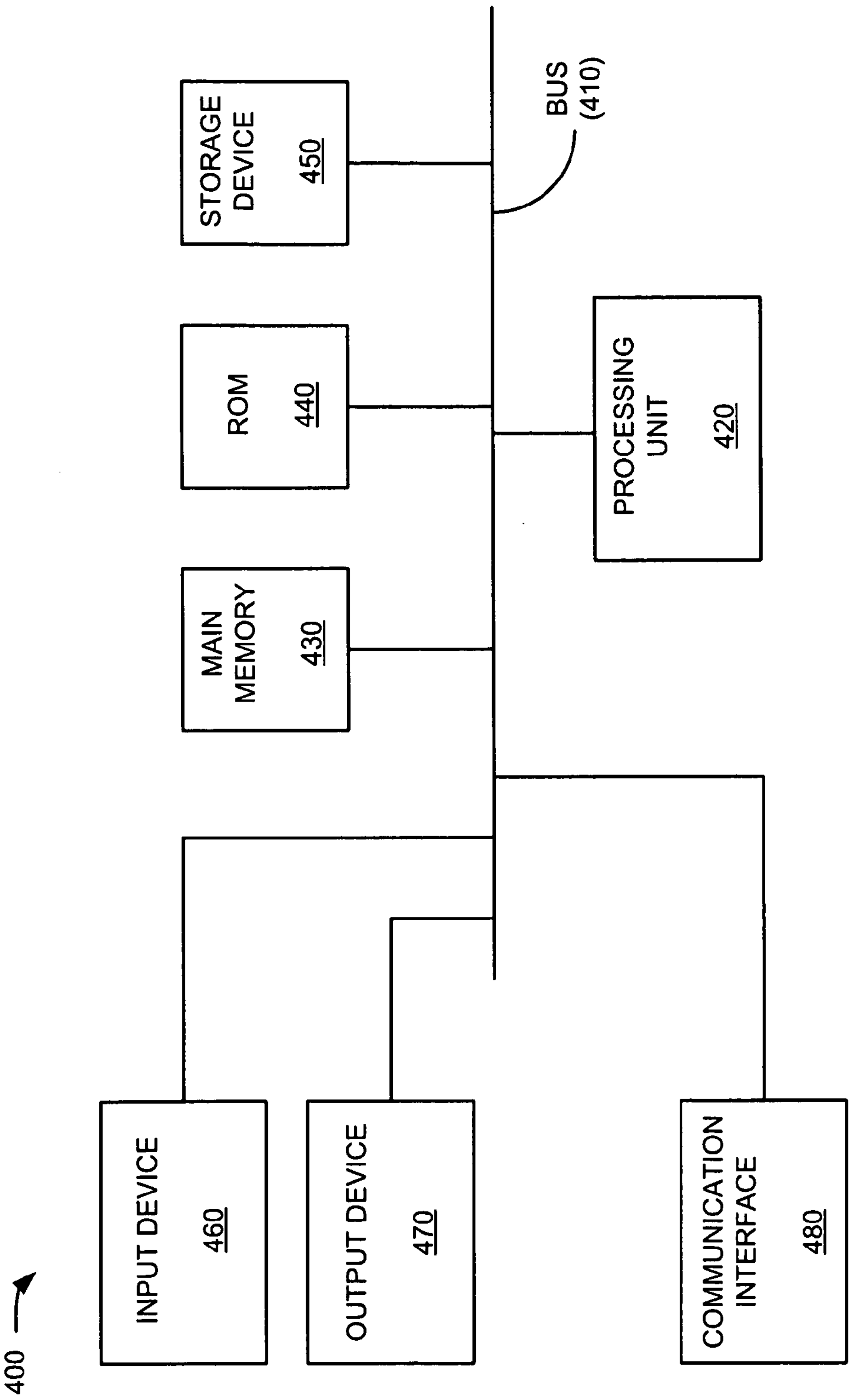
FIG. 4 depicts a diagram of exemplary components of a client device, a vehicle information system, a location information server, and/or a distribution server of FIG. 2.

FIG. 4 depicts a diagram of exemplary components of a device 400 that may correspond to client device 120 (e.g., if client device 120 is a laptop computer), vehicle information system 130, location information server 230, and/or distribution server 240. As illustrated, device 400 may include a bus 410, a processing unit 420, a main memory 430, a ROM 440, a storage device 450, an input device 460, an output device 470, and/or a communication interface 480. Bus 410 may include a path that permits communication among the components of device 400.

Processing unit 420 may include one or more processors, microprocessors, or other types of processors that may interpret and execute instructions. Main memory 430 may include a RAM or another type of dynamic storage device that may store information and instructions for execution by processing unit 420. ROM 440 may include a ROM device or another type of static storage device that may store static information and/or instructions for use by processing unit 420. Storage device 450 may include a magnetic and/or optical recording medium and its corresponding drive.

Input device 460 may include a mechanism that permits an operator to input information to device 400, such as a keyboard, a mouse, a pen, a microphone, voice recognition and/or biometric mechanisms, a touch screen, etc. Output device 470 may include a mechanism that outputs information to the operator, including a display, a printer, a speaker, etc. Communication interface 480 may include any transceiver-like mechanism that enables device 400 to communicate with other devices and/or systems. For example, communication interface 480 may include mechanisms for communicating with another device or system via a network, such as communications network 110 and/or short-range network 140.

As described herein, device 400 may perform certain operations in response to processing unit 420 executing software instructions contained in a computer-readable medium, such as main memory 430. The software instructions may be read into main memory 430 from another computer-readable medium, such as storage device 450, or from another device via communication interface 480. The software instructions contained in main memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may contain fewer, different, differently arranged, or additional components than depicted in FIG. 4. In still other implementations, one or more components of device 400 may perform one or more other tasks described as being performed by one or more other components of device 400.

Figure 5:
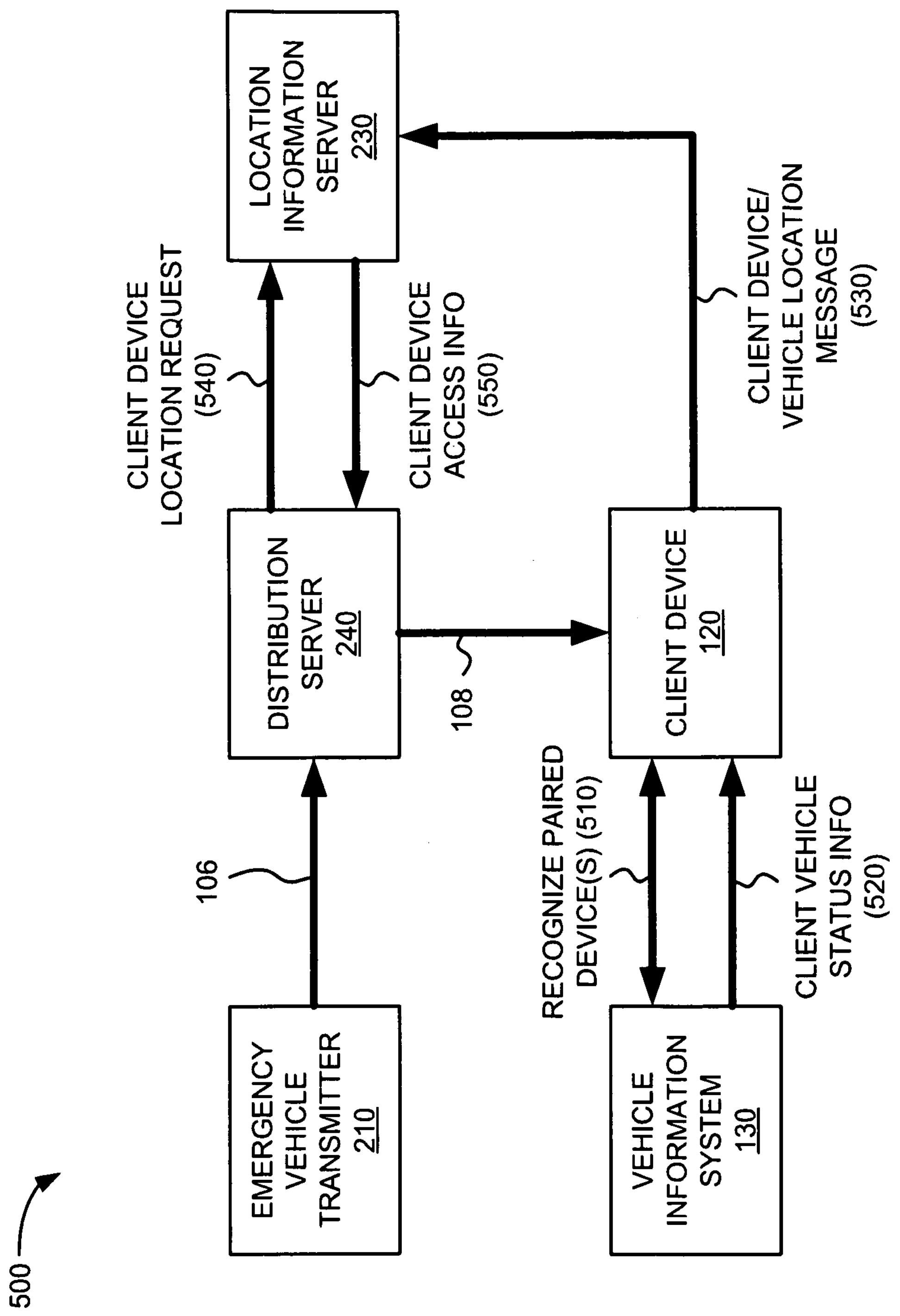
FIG. 5 illustrates a diagram of exemplary interactions among components of an exemplary portion of the network depicted in FIG. 2.

FIG. 5 illustrates a diagram of exemplary interactions among components of an exemplary portion 500 of network 200. As illustrated, exemplary network portion 500 may include client device 120, vehicle information system 130, emergency vehicle transmitter 210, location information server 230, and distribution server 240. Client device 120, vehicle information system 130, emergency vehicle transmitter 210, location information server 230, and distribution server 240 may include features described above in connection with, for example, FIGS. 1A, 1B, and 2.

As shown in FIG. 5, client device 120 may recognize one or more paired devices over a short-range network as shown by reference number 510. For example, client device 120 may use Bluetooth protocols to identify vehicle information system 130. In another example, client device 120 may use a Wi-Fi protocol to identify vehicle information system 130. Client device 120 and vehicle information system 130 may establish a paired relationship, for example, by creating a link key and/or by establishing communications over an encrypted link. As part of establishing the paired relationship vehicle information system 130 may provide, to client device 120, a device name, a vehicle class, a list of types of available information, and/or other technical information associated with vehicle information system 130.

The connection between vehicle information system 130 and client device 120 may permit transmission of client vehicle status information 520 to client device 120. For example, vehicle information system 130 may send vehicle navigation information, regarding client vehicle 104, to client device 120. Client vehicle status information 520 may be sent, for example, on a real-time continuous basis. In other implementations, client vehicle status information 520 may be sent (by vehicle information system 130) or received (by client device 120) at regular intervals (e.g., 1 to 5 second intervals) to conserve resources.

Client device 120 may combine client vehicle status information 520 with information about client device 120 to form a joint client device/vehicle location message 530. For example, client device 120 may provide an access number, a device identifier, an Internet protocol (IP) address, and/or other information to allow client device 120 to be associated with vehicle status information 520. Client device 120 may send client device/vehicle location message 530 to location information server 230 for later evaluation/retrieval. As with the connection between client device 120 and vehicle information system 130, client device/vehicle location message 530 may be sent from client device 120 to location information server 230 on a real-time continuous basis or at regular intervals.

Emergency vehicle transmitter 210 may send emergency vehicle signal 106 (e.g., a radio frequency (RF) signal) that indicates the position, direction, and/or destination of emergency responder vehicle 102. For example, an operator of emergency responder vehicle 102 may initiate emergency vehicle signal 106 by initiating an emergency mode in vehicle 102 (e.g., by activating a siren and/or emergency lights). The position, direction, and/or destination of emergency responder vehicle 102 may be retrieved, for example, from a vehicle navigation system. The position, direction, and/or destination of emergency responder vehicle 102 may be based on, for example, geo-position information, tracking information from a vehicle tracking system, manual route/destination entries from an operator, etc. Emergency vehicle signal 106 may be received (via communications network 110) at distribution server 240.

In response to emergency vehicle signal 106, distribution server 240 may send a client device location request 540 to location information server 230. Client device location request 540 may request location information sever 230 to identify client devices 120 within a particular range of emergency responder vehicle 102 (e.g., a particular distance from emergency responder vehicle 102, a particular area/zone currently occupied by emergency responder vehicle 102, etc.). Based on client device/vehicle location message 530 received from client device 120, location information server 230 may determine if client device 120 (e.g., associated with client vehicle 104) is within the particular range of emergency responder vehicle 102 (based on the position, direction, and/or destination information provided in emergency vehicle signal 106). Location information server 230 may identify one or more client device 120 within the particular range and provide the appropriate access information for each client device 120, as indicated by reference 550, to distribution server 240.

Distribution server 240 may receive client device access information 550 and associate client device access information 550 with emergency vehicle signal 106. Distribution server 240 may apply routing information for client device 120 and forward emergency vehicle signal 106 as emergency notification signal 108 to client device 120.

Although FIG. 5 shows exemplary components of network portion 500, in other implementations, network portion 500 may contain fewer, different, differently arranged, or additional components than depicted in FIG. 5. In still other implementations, one or more components of network portion 500 may perform one or more other tasks described as being performed by one or more other components of network portion 500.

Figure 6:
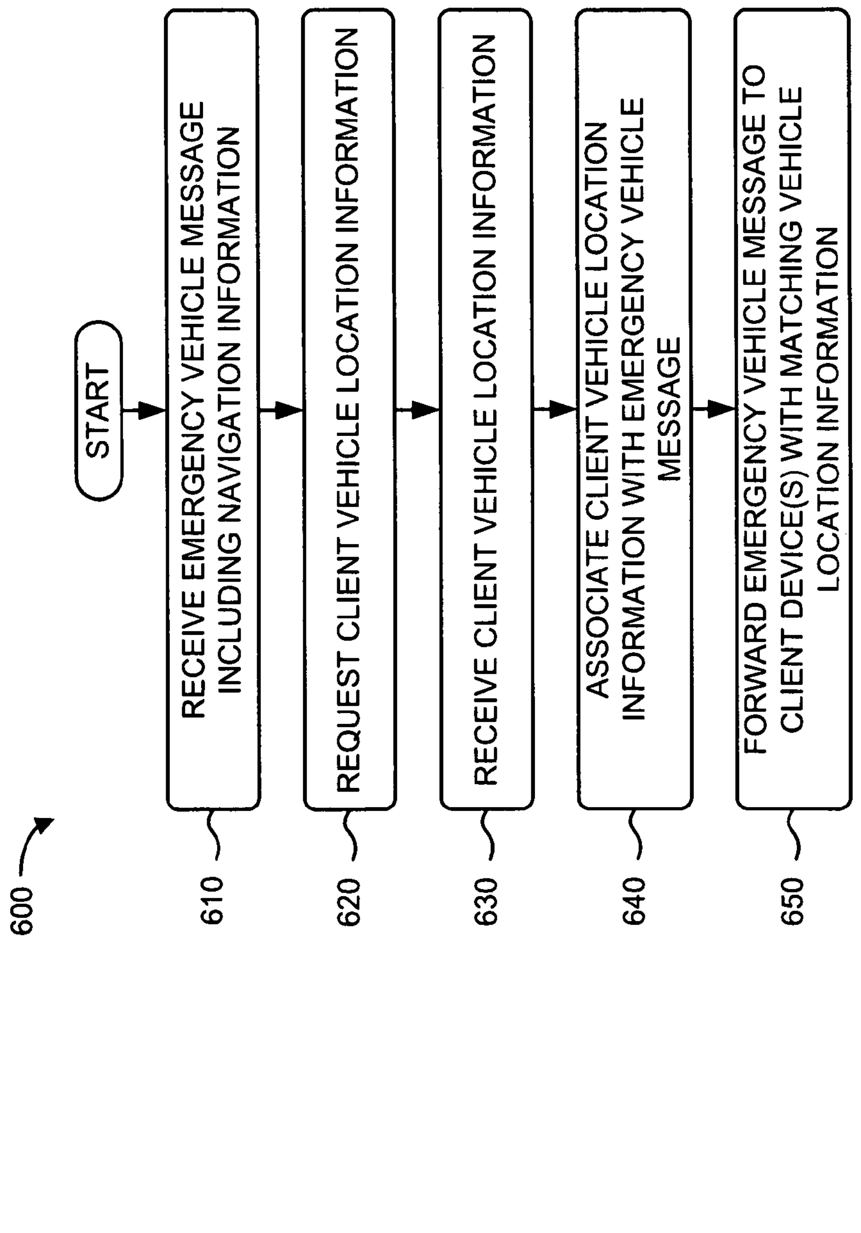
FIG. 6 depicts a flow chart of an exemplary process for providing an emergency responder vehicle warning to a client device according to implementations described herein.

FIG. 6 depicts a flow chart of an exemplary process 600 for providing an emergency responder vehicle warning to a client device according to implementations described herein. In one implementation, process 600 may be performed by distribution server 240. In other implementations, some or all of process 600 may be performed by another device or group of devices (e.g., communicating with distribution server 240), such as location information sever 230.

As illustrated in FIG. 6, process 600 may include receiving an emergency vehicle message that includes navigation information of an emergency vehicle (block 610). For example, in implementations described above in connection with FIG. 5, distribution server 240 may receive emergency vehicle signal 106 from emergency responder vehicle 102. Emergency vehicle signal 106 may include direction and/or location information of emergency responder vehicle 102. Emergency vehicle signal 106 may be provided to distribution server 240 as an RF signal via communications network 110.

Client vehicle location information may be requested (block 620) and the client vehicle location information may be received (block 630). For example, in implementations described above in connection with FIG. 5, distribution server 240 may send client device location request 540, to location information server 230, to identify client devices 120 within a particular range of emergency responder vehicle 102. Location information server 230 may identify a client device 120 within the particular range of emergency responder vehicle 102 and provide client device access information 550, for client device 120, to distribution server 240.

The client vehicle location information may be associated with the emergency vehicle message (block 640) and the emergency vehicle message may be forwarded to one or more client devices with matching vehicle location information (block 650). For example, in implementations described above in connection with FIG. 5, distribution server 240 may receive client device access information 550 for one or more client device 120 and associate client device access information 550 with emergency vehicle signal 106. Distribution server 240 may apply routing information for client device 120 and forward emergency vehicle signal 106 as emergency notification signal 108 to client device 120.

Figure 7:
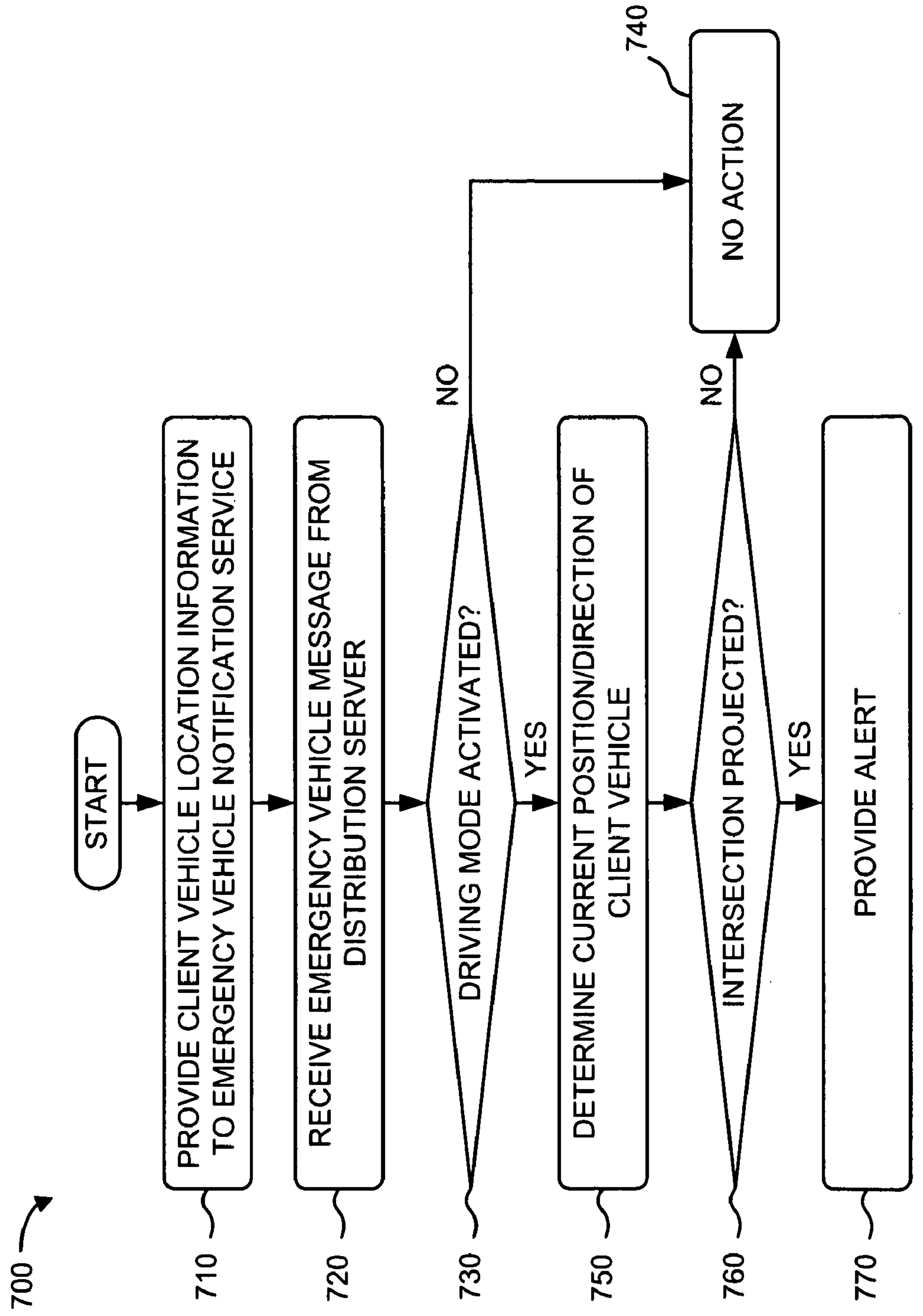
FIG. 7 depicts a flow chart of an exemplary process for providing an emergency responder vehicle warning to a user according to implementations described herein.

FIG. 7 depicts a flow chart of an exemplary process 700 for providing an emergency responder vehicle warning to a user according to implementations described herein. In one implementation, process 700 may be performed by client device 120. In other implementations, some or all of process 700 may be performed by another device or group of devices (e.g., communicating with client device 120), such as vehicle information system 130.

As illustrated in FIG. 7, process 700 may include providing client vehicle location information to an emergency notification service (block 710). For example, in implementations described above in connection with FIG. 5, client device 120 may recognize vehicle information system 130 over short-range network 140 as shown by reference number 510. Client device 120 may use Bluetooth, Wi-Fi, and/or other short-range wireless protocols to identify vehicle information system 130 and retrieve location information from vehicle information system 130. Location information may include a single indicator (e.g., a geographic position of client vehicle 104) or multiple indicators (e.g., a location, direction, speed, destination, etc.). In another implementation, client device 120 may determine its own location (e.g., in conjunction with locator system 220 or another navigational assistance system). The location information may be sent to the emergency notification service (e.g., location information server 240) via, for example, communications network 110.

An emergency vehicle message may be received from a distribution server (block 720). For example, in implementations described above in connection with FIG. 5, client device 120 may receive emergency notification signal 108 from distribution server 240. Emergency notification signal 108 may include information regarding the position, direction, and/or destination of an emergency responder vehicle (e.g., emergency responder vehicle 102).

It may be determined if a driving mode is activated (block 730). For example, in implementations described above in connection with FIG. 1A, client device 120 may identify if client device 120 has been manually set to a driving mode so as to process emergency vehicle messages. Alternatively, client device 120 may automatically activate the driving mode as a result of pairing with a vehicle information system (e.g., vehicle information system 130) over a short-range network. If a driving mode is not activated (block 730—NO), no action is taken (block 740). For example, client device 120 may ignore the emergency vehicle message.

If a driving mode is activated (block 730—YES), the current position/direction of a client vehicle may be determined (block 750) and it may be determined if an intersection of the emergency vehicle and the client vehicle is projected (block 760). For example, client device 120 may retrieve/receive position, direction, and/or destination information of client vehicle 104 from vehicle information system 130. In another implementation, client device 120 may also retrieve/receive other vehicle information, such as vehicle speed, projected routes, etc. In still another implementation, client device 120 may determine its own position, direction, and/or destination information (e.g., using a third-party navigational product accessible via client device 120). Using the position, direction and/or destination information from emergency notification signal 108 and the vehicle information obtained in process block 750, client device 120 may determine whether emergency responder vehicle 102 is projected to intersect (or nearly intersect within a particular distance) with client vehicle 104. In another implementation, client device 120 may provide the information from emergency notification signal 108 to vehicle information system 130 (or to another networked entity) to determine if an intersection of the emergency vehicle and the client vehicle is projected.

If an intersection of the emergency vehicle and the client vehicle is not projected (block 760—NO), no action is taken (block 740). For example, client device 120 may ignore the emergency vehicle message. If an intersection of the emergency vehicle and the client vehicle is projected (block 760—YES), an alert may be provided (block 770). For example, client device 120 may provide a warning indication to a user of client device 120. The warning indication may be in the form of an audible tone, a message over a speakerphone, a text message, and/or other indications. In one implementation, the warning indication may be a progressive indication. For example, client device 120 may provide increasingly louder tones as the projected intersection of emergency responder vehicle 102 and client vehicle 104 becomes closer. As another example, client device 120 may provide different forms of warning indications depending on how closely (e.g., in time or distance) the projected intersection is calculated. In another implementation, warning could also be displayed graphically on user device 120 using, for example, a navigation application or on another GPS graphic mapping display where client vehicle 104 is shown on the real time map in relationship to the approaching emergency responder vehicle 102.

In one implementation, processes 600 and 700 described above may be repeated as the emergency responder vehicle provides additional emergency vehicle messages.

Figure 8:
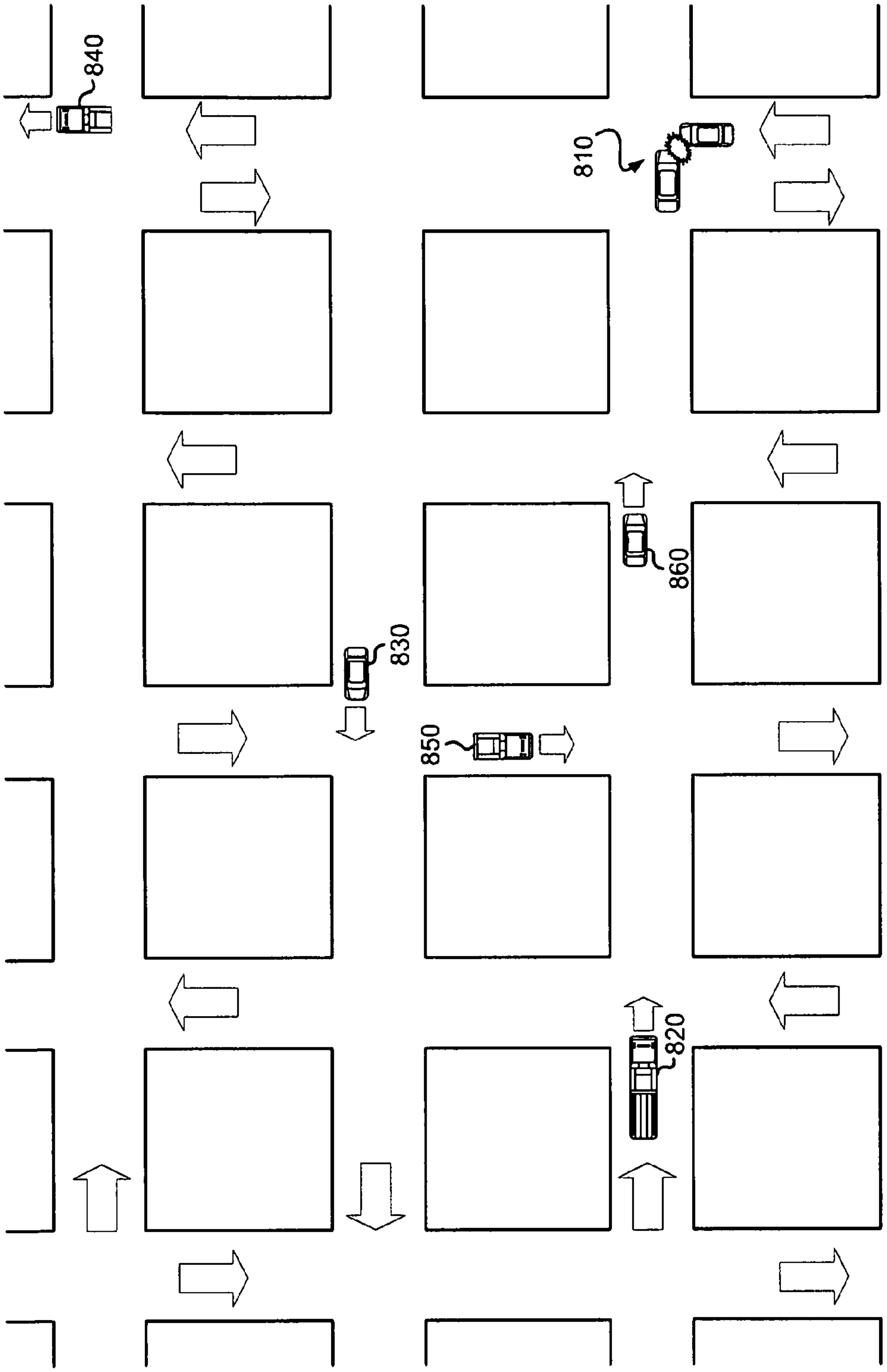
FIG. 8 provides a diagram illustrating an exemplary implementation of an emergency responder vehicle warning system.

FIG. 8 provides a diagram illustrating an exemplary implementation of an emergency responder vehicle warning system. In the example of FIG. 8, a multi-vehicle accident at a particular location 810 occurs and an emergency responder vehicle 820 progresses toward location 810. Assume each of client vehicles 830, 840, 850 and 860 has client devices (e.g., client devices 120) equipped with an emergency responder vehicle warning system. Thus, the client devices associated with each of client vehicles 830, 840, 850 and 860 have provided recent position information to location information server (e.g., location information server 230). The position information may have been obtained from, for example, vehicle information systems associated with client vehicles 830, 840, 850 and 860 or from a position determining system associated with the client devices.

Assume emergency responder vehicle 820 initiates an emergency vehicle signal (e.g., emergency vehicle signal 106 that is initiated when a siren for emergency responder vehicle 820 is activated). The emergency vehicle signal includes position and route information for emergency responder vehicle 820. The signal is received at a distribution server (e.g., distribution server 240) that requests (from the location information server) a listing of client devices within a 1.5 mile radius of the position provided in the emergency vehicle signal. The location information server provides a list including client devices associated with client vehicles 830, 840, 850 and 860. The distribution server, thus, forwards the emergency vehicle signal to each of the client devices associated with client vehicles 830, 840, 850 and 860.

Each of the client devices compare the position and route information in the emergency vehicle signal with position, route, and/or other navigational information for respective client vehicles 830, 840, 850 and 860. Client devices associated with client vehicles 830 and 840 can determine that their respective paths (as indicated in FIG. 8) do not project to intersect the route of emergency responder vehicle 820. Thus, the client devices associated with client vehicles 830 and 840 will take no action in response to the emergency vehicle signal. In contrast, client devices associated with client vehicles 850 and 860 can determine that their respective paths (as also indicated in FIG. 8) do project to intersect the route of emergency responder vehicle 820. Thus, the client devices associated with client vehicles 850 and 860 will take no action in response to the emergency vehicle signal. The client devices associated with client vehicles 850 and 860 will provide a warning indication to the driver of client vehicles 850 and 860 in the form of an audible tone, a message over a speakerphone, a text message, and/or another indication.

Systems and/or methods described herein may provide for associating a client device with navigational information of a client vehicle and providing the navigational information of the client vehicle to an emergency vehicle notification service. The client device may receive an emergency vehicle message from the emergency vehicle notification service. The emergency vehicle message may include navigational information of an emergency responder vehicle. The client device may determine updated navigational information of the client vehicle and may identify a projected intersection between a path of the emergency responder vehicle and a path of the client vehicle based on the emergency vehicle message and the updated navigational information of the client vehicle. The client device can then generate an alert signal to a user of the client device based on the identifying of the projected intersection.

The foregoing description provides illustration and description, but is not intended to be exhaustive or to limit the embodiments to the precise form disclosed. Modifications and variations are possible in light of the above teachings or may be acquired from practice of systems and methods disclosed herein.

For example, in another implementation, a client device and a vehicle information system may be integrated as a single unit within a vehicle. Thus, alerts from an emergency responder vehicle may be provided directly to the vehicle information system. Also, while series of blocks have been described with regard to FIGS. 7 and 8, the order of the blocks may differ in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:

providing, by a client device, navigational information of a client vehicle solely to a first server, the navigational information being used by the first server to provide information identifying the client device to a second server when the client device is within a particular range of an emergency responder vehicle;

receiving, by the client device, an emergency vehicle message solely from the second server when the client device is within the particular range of the emergency responder vehicle, the emergency vehicle message including navigational information of the emergency responder vehicle, and the first server being different from the second server;

determining, by the client device, whether a particular mode of the client device is activated;

determining, by the client device, updated navigational information of the client vehicle when the particular mode of the client device is activated;

determining, by the client device, whether the emergency responder vehicle is projected to intersect with the client vehicle based on the emergency vehicle message and the updated navigational information of the client vehicle; and providing, by the client device, an alert signal to a user of the client device when the emergency responder vehicle is projected to intersect with the client vehicle.

2. The method of claim 1, further comprising:

activating the particular mode of the client device;

communicating, after activating the particular mode, with a vehicle information system of the client vehicle to receive the navigation information of the client vehicle from the vehicle information system; and associating, before providing the navigational information of the client vehicle, the client device with the navigational information of the client vehicle.

3. The method of claim 2, where communicating with the vehicle information system of the client vehicle comprises:

identifying, by the client device, a device, within a short-range wireless network, that has access to the vehicle information system; and receiving, from the device, the navigation information of the client vehicle from the vehicle information system.

4. The method of claim 1, where the navigational information of the client vehicle includes information regarding one or more of:

a geographic position of the client vehicle, a direction of the client vehicle, a destination of the client vehicle, a projected route of the client vehicle, or a speed of the client vehicle.

5. The method of claim 1, where the alert signal includes one or more of:

an audible tone, a message provided via a speaker of the client device, or a text message.

6. The method of claim 1, where providing the alert signal includes:

identifying a projected intersection between a path of the emergency responder vehicle and a path of the client vehicle, and providing increasingly louder tones as a location of the projected intersection becomes closer to a location of the client vehicle.

7. The method of claim 1, where the client device includes one of:

a radiotelephone, a personal communications system (PCS) terminal, a personal digital assistant (PDA), or a laptop computer.

8. The method of claim 1, where the navigational information of the emergency responder vehicle indicates that the emergency responder vehicle is within a particular distance of a position identified in the navigational information of the client vehicle.

9. The method of claim 1, where the navigational information of the client vehicle includes information regarding a geographic position of the client vehicle, and where the updated navigational information of the client vehicle includes information regarding one or more of:

another geographic position of the client vehicle, a direction of the client vehicle, a destination of the client vehicle,
a projected route of the client vehicle, or
a speed of the client vehicle.

10. A client device comprising:
a processor to:
provide information regarding a position of a client vehicle solely to a first server,
the information regarding the position of the client vehicle being used by the first server to provide information identifying the client device to a second server when the client device is within a particular range of an emergency responder vehicle;
receive an emergency vehicle message solely from the second server when the client device is within the particular range of the emergency responder vehicle,
the emergency vehicle message including navigational information of the emergency responder vehicle, and
the first server being different from the second server,
determine whether a particular mode of the client device is activated,
determine navigational information of the client vehicle when the particular mode of the client device is activated,
identify a projected intersection between a path of the emergency responder vehicle and a path of the client vehicle based on the emergency vehicle message and the navigational information of the client vehicle, and
provide an alert signal to a user of the client device based on the projected intersection.

11. The client device of claim 10, where, when providing the information regarding the position of the client vehicle, the processor is to:
associate the client device with other navigational information of the client vehicle obtained prior to providing the information regarding the position of the client vehicle, and
provide, based on the other navigational information of the client vehicle, the information regarding the position of the client vehicle to the first server.

12. The client device of claim 10, where the navigational information of the client vehicle includes information regarding one or more of:
a position of the client vehicle,
a direction of the client vehicle,
a destination of the client vehicle,
a projected route of the client vehicle, or
a speed of the client vehicle.

13. The client device of claim 10, where the client device comprises one or more of:
a radiotelephone,
a personal communications system (PCS) terminal,
a personal digital assistant (PDA), or
a laptop computer.

14. A system comprising:
one or more server devices to:
receive an emergency vehicle message,
the emergency vehicle message including navigational information of an emergency responder vehicle,
transmit, based on the navigational information and to one or more other server devices, a request for information identifying one or more client devices within a particular range of the emergency responder vehicle,
the one or more other server devices being different from the one or more client devices,
receive, from the one or more other server devices, the information identifying the one or more client devices within the particular range of the emergency responder vehicle, and
provide, based on the information identifying the one or more client devices, the navigational information of the emergency responder vehicle to the one or more client devices.

15. The system of claim 14, where the navigational information of the emergency responder vehicle includes information regarding one or more of:
a geographic position of the emergency responder vehicle,
a direction of the emergency responder vehicle,
a destination of the emergency responder vehicle,
a projected route of the emergency responder vehicle, or
a speed of the emergency responder vehicle.

16. A method comprising:
receiving, by one or more computing devices, a message from an emergency responder vehicle,
the message including navigational information associated with a geographic position of the emergency responder vehicle;
transmitting, by the one or more computing devices and to one or more other computing devices, a request for information identifying a client device associated with a vehicle that is within a particular distance of the geographic position of the emergency responder vehicle,
the one or more other computing devices being different from the client device;
receiving, by the one or more computing devices and from the one or more other computing devices, the information identifying the client device associated with the vehicle that is within the particular distance of the geographic position of the emergency responder vehicle; and
forwarding, by the one or more computing devices and to the client device, the navigational information associated with the geographic position of the emergency responder vehicle.

17. The method of claim 16, where the message from the emergency responder vehicle includes:
a radio frequency (RF) signal sent via a wireless communications network.

18. The method of claim 16, further comprising:
receiving, from a group of client devices, geographic position information for vehicles associated with the group of client devices,
the group of client devices including the client device, and
the vehicles including the vehicle; and
selecting the client device from the group of client devices based on the geographic position information.

19. A non-transitory computer-readable medium storing instructions, the instructions comprising:
one or more instructions that, when executed by a device, cause the device to:
provide information regarding a position of a client vehicle solely to a first server,
the information regarding the position of the client vehicle being used by the first server to provide information identifying the device to a second server when the device is within a particular range of an emergency responder vehicle;
receive an emergency vehicle message solely from the second server when the device is within the particular range of the emergency responder vehicle, the emergency vehicle message including route information for the emergency responder vehicle, and the first server being different from the second server;

determine whether a particular mode of the device is activated, determine navigation information of the client vehicle when the particular mode of the device is activated;

identify a projected intersection based on the route information for the emergency responder vehicle and a path that is based on the navigation information of the client vehicle; and provide an alert signal to a user of the device based on the identification of the projected intersection.

20. The non-transitory computer-readable medium of claim 19, where the navigation information of the client vehicle includes information regarding one or more of:

a geographic position of the client vehicle, a direction of the client vehicle, a destination of the client vehicle, a projected route of the client vehicle, or a speed of the client vehicle.

21. The non-transitory computer-readable medium of claim 19, where, when the particular mode is activated, the particular mode indicates that the user of the device is operating the client vehicle.

* * * * *